United States Patent [19]
Odink

[11] Patent Number: 6,006,898
[45] Date of Patent: Dec. 28, 1999

[54] CONVEYOR BELT AND TRANSPORTING DEVICE PROVIDED THEREWITH

[75] Inventor: Albert Jan Odink, Be Borne, Netherlands

[73] Assignee: Ashworth Jonge Poerink B.V., Borne, Netherlands

[21] Appl. No.: 08/921,152

[22] Filed: Aug. 29, 1997

[30] Foreign Application Priority Data

Aug. 30, 1996 [NL] Netherlands ........................... 1003929

[51] Int. Cl.⁶ .................................................. B65G 17/06
[52] U.S. Cl. ........................... 198/853; 198/778; 198/833
[58] Field of Search ..................................... 198/778, 831, 198/833, 853

[56] References Cited

U.S. PATENT DOCUMENTS

| | | | |
|---|---|---|---|
| 3,270,863 | 9/1966 | Ackles | 198/203 |
| 4,850,475 | 7/1989 | Lupo et al. | 198/778 |
| 5,070,999 | 12/1991 | Layne et al. | 198/853 X |
| 5,139,135 | 8/1992 | Irwin et al. | 198/778 X |
| 5,141,099 | 8/1992 | Baumgartner | 198/778 |
| 5,358,096 | 10/1994 | Faulkner et al. | 198/778 |
| 5,566,817 | 10/1996 | Meeker | 198/853 X |
| 5,690,210 | 11/1997 | Layne | 198/853 |

FOREIGN PATENT DOCUMENTS 2088498  5/1971  France .

*Primary Examiner*—James R. Bidwell
*Attorney, Agent, or Firm*—Banner & Witcoff, Ltd.

[57] ABSTRACT

A conveyor belt is formed from a plurality of conveyor links having crest and valley link bodies and apertures. The links are interwoven together and operatively coupled together by hinge pins extending in a transverse direction to the longitudinal direction of travel. Each link as on at least one end, an integral drive arm in the same plane as the link body and adapted to engage a drive element. The drive arm has an angled surface and a straight surface. The angled surface biases the drive element inward and into abutment with the straight surface of a neighboring link to provide a stable operating engagement between the drive element and conveyor link.

27 Claims, 8 Drawing Sheets

CONVEYOR BELT AND TRANSPORTING DEVICE PROVIDED THEREWITH

The invention relates to a modular conveyor belt. Such a conveyor belt comprises a plurality of for instance identical links which are connected hingedly to each other, which hinges extend perpendicularly of the transporting direction of the belt such that the conveyor belt is bendable parallel to the hinge axes out of its principal plane.

It is an object of the invention to embody a modular conveyor belt such that it is suitable to be combined with a drive of a construction such that the space available in the principal plane of the conveyor belt is utilized as well as possible. A usual conveyor belt is for instance driven by toothed wheels via the links such that the rotation axis of the toothed wheels extends parallel to the hinge axes. The toothed wheels therefore extend with their principal plane in transverse direction relative to the principal plane of the conveyor belt. This means that the transverse dimension of the drive relative to the principal plane of the conveyor belt is relatively large. The invention now aims to embody the conveyor belt such that the overall height can be very small and use is made of the space often available in the region of the principal plane of the conveyor belt. The conveyor belt must therefore be suitable for driving via the respective links via the side edges of the conveyor belt.

In respect of the above the invention provides a conveyor belt comprising a plurality of link elements which are coupled pair-wise to each other by means of a hinge extending in transverse direction, which hinge comprises at least one hinge pin present on the one link element and extending transversely of the longitudinal direction of the conveyor belt and a plurality of eyes present on the other link element which engage round said hinge pin(s) and are correspondingly registered such that the conveyor belt is bendable in transverse direction relative to the principal plane of the conveyor belt, wherein the eyes in the principal plane of the conveyor belt have an enlarged dimension such that the conveyor belt is also bendable in its principal plane and wherein at least a number of link elements at equal mutual pitch distances have on at least one free side end zone a drive protrusion which is adapted to co-act with a drive, for instance a drivable toothed wheel or a drivable chain.

It is noted that the conveyor belt according to the invention is not necessarily limited to a combination with a drive which extends substantially in the principal plane of the conveyor belt. A side driving according to the invention can also take place by means of drives extending for instance transversely of the conveyor belt.

A specific embodiment has the special feature that the eyes have an enlarged dimension in transverse direction of the principal plane of the conveyor belt such that limited torsion of the conveyor belt is possible.

Yet another embodiment has the feature that each protrusion has a contact surface for co-action with a drive element forming part of a drive, for instance a tooth of a toothed wheel or a bush forming part of a hinge between two links of a drive chain, which contact surface has a form such that while exerting a pressure force on this contact surface the drive element assumes a stable position relative thereto in which the drive element undergoes an inward directed force relative to the conveyor belt and a stop surface blocks an inward directed displacement of the drive element. This embodiment has the advantage that the drive elements and the links always assume mutually stable positions. This may prevent jamming and other failures during operation, particularly in unforeseen conditions.

A preferred embodiment has the special feature that each link element has a generally zigzag form such that the crests of a link fit with clearance in the valleys between the respective crests of an adjoining link and wherein the thus interwovenly placed crests of adjoining links have the said eyes through which the hinge pin(s) extends/extend.

The link elements can consist of any suitable material, for instance metal, such as steel, or plastic. An embodiment is however recommended in which each link element consists substantially of POM. POM is a material combining a very good form-stability with further mechanically favourable properties, in particular a great wear-resistance and temperature-resistance. The wear-resistance is particularly important because the conveyor belt is guided slidably along at least a portion of its active part over one or more support surfaces or support strips. Such supporting means will also be manufactured from suitable material, for instance steel, nylon or other materials which have a relatively low coefficient of friction in common with the material of the link elements and are wear-resistant.

It will be apparent that the hinge pins must be embodied mechanically in suitable manner. They must have a relatively low coefficient of friction in common with the material of the link elements and be capable of transmitting the forces acting between the link elements in the correct manner without any appreciable elastic and plastic deformations.

A specific variant has the special feature that each link element consists of fibre-reinforced plastic, for instance glass fibre-reinforced POM.

An easy interchangeability without the necessity of having to make selections of suitable link elements during repairs is ensured with an embodiment in which all link elements are identical.

The invention further relates to a transporting device comprising a conveyor belt in accordance with the above stated specification and at least one drive which is adapted to drive the conveyor belt by exerting a pressure force for a successive time duration in the longitudinal direction of the conveyor belt on a drive protrusion forming part of a link element.

A particular embodiment of this transporting device has the special feature that the drive comprises a drive toothed wheel.

In an alternative embodiment the device has the special feature that the drive comprises a drive chain.

In order to ensure a positive contact between the drive chain and the link elements in the most varying conditions, a variant can have the special feature that the drive chain is held with its active part in contact with the conveyor belt by guide means.

This latter embodiment can have the feature that the guide means comprise a sliding strip of wear-resistant material.

A preferred embodiment has the special feature that the drive chain comprises links which are mutually coupled by external cylindrical bushes enclosing hinges, which bushes serve for driving co-action with the drive protrusions of the link elements of the conveyor belt, which bushes are substantially freely rotatable round the associated hinge axes. This variant has the advantage that both the drive chain and the link elements are subject to only a very slight degree of friction and wear.

Depending on the required driving force, the available space and other conditions, drive means and conveyor belts can mutually co-act in diverse ways. A particular embodiment has the special feature that a conveyor belt is driven from both sides by drive means.

Another embodiment has the special feature that one drive serves to drive in opposing directions conveyor belts extending substantially parallel to each other on either side thereof and in one principal plane.

Yet another embodiment has the special feature that in the region of a drive the conveyor belt is curved in its principal plane.

Yet another embodiment has the special feature that at least two drives are placed one above another and are collectively coupled directly to a drive shaft.

Yet another embodiment has the special feature that the conveyor belt consists of mutually twistable link elements and is twisted at least locally.

This latter variant can have the special feature that the conveyor belt has at least one generally helical part with a difference in height between infeed and outfeed.

An embodiment of the described type in which at least two drives are placed one above the other and collectively coupled directly to a drive shaft can be combined with this latter aspect, wherein the helical part extends through more than 360°.

The invention will now be elucidated with reference to the annexed drawings. Herein:

Figure 1:
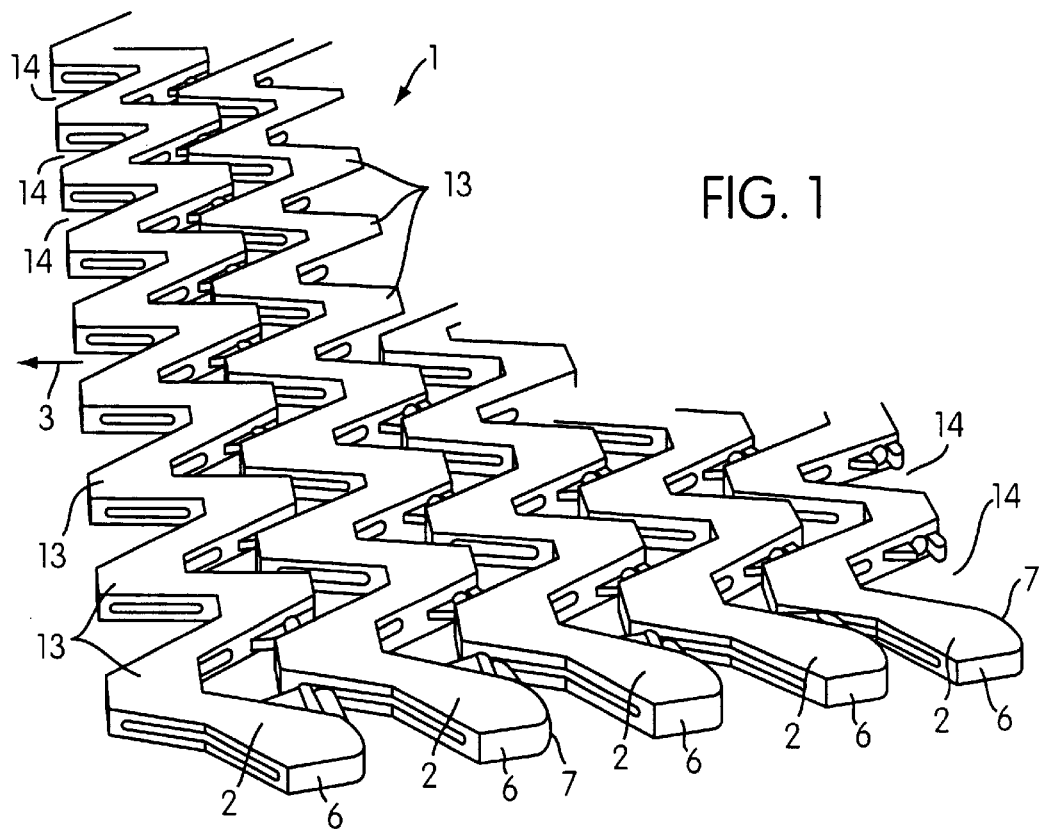
FIG. 1 shows a partly perspective view of a part of a conveyor belt according to the invention.
Figure 2:
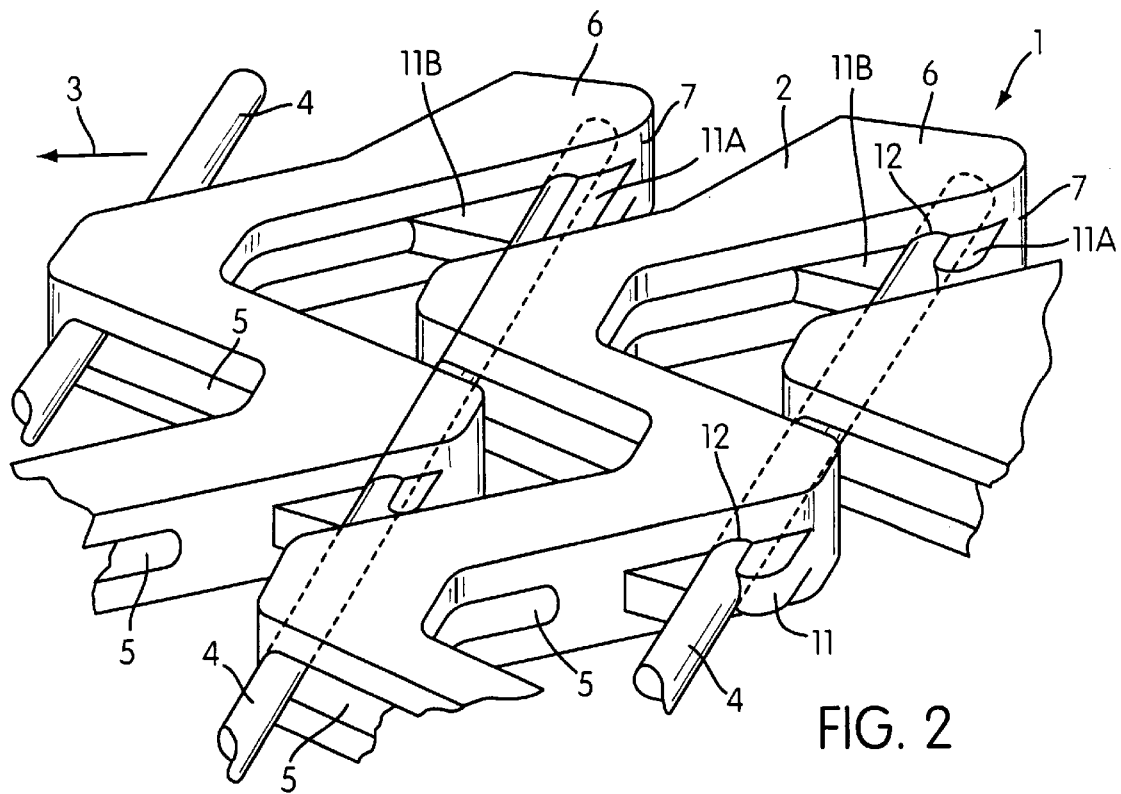
FIG. 2 shows a perspective view of a detail of the conveyor belt on enlarged scale.

FIG. 1 shows a conveyor belt 1 according to the invention. This comprises a plurality of link elements coupled to each other in pairs and all designated with 2. Link elements 2 are mutually coupled by means of respective hinges extending in transverse direction. Each hinge comprises a steel hinge pin 4 present on the one link element and extending transversely of the longitudinal direction, also transporting direction 3, of conveyor belt 1 and a plurality of eyes 5 present on the other link element which engage round said pin 4 and are correspondingly registered such that conveyor belt 1 is bendable in transverse direction relative to the principal plane of conveyor belt 1 (see for instance FIG. 6, the region of the deflecting rollers), wherein the eyes 5 in the principal plane of the conveyor belt have an enlarged dimension in the manner shown particularly clearly in FIG. 2 such that conveyor belt 1 is also bendable in its principal plane (see for instance FIG. 7, in which this aspect is shown clearly). In the embodiments shown in the figures all link elements are provided on at least one free side end zone with respective drive protrusions or arms 6. As shown particularly clearly in FIG. 3, these drive protrusions 6 are adapted to co-act with a drive, in this case a drivable chain 17.

Figure 3:
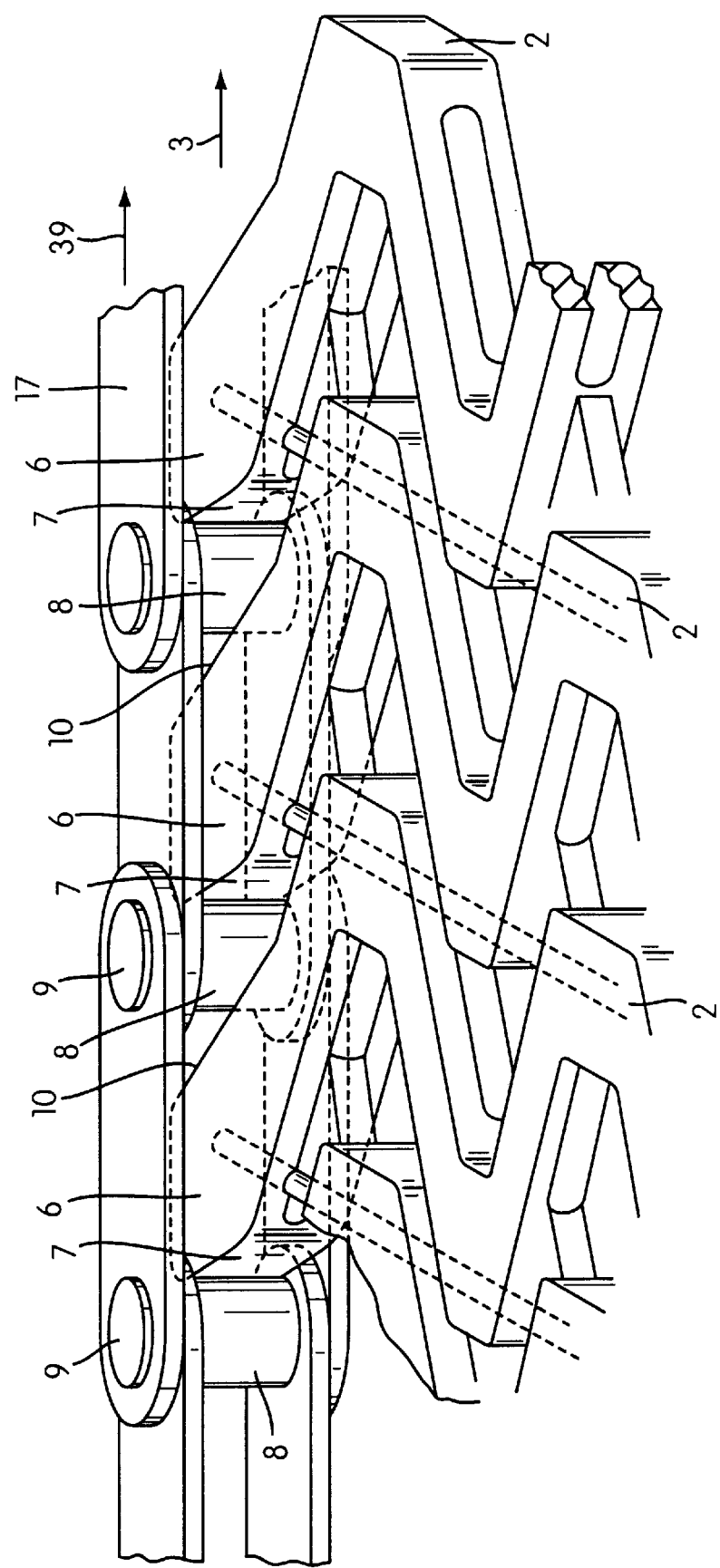
FIG. 3 is a perspective view of the conveyor belt driven by a drive chain.

Each protrusion has a contact surface 7 (see particularly FIGS. 2 and 3) for co-action with a drive element forming part of a drive, according to FIG. 3 a freely rotatable cylindrical bush 8 arranged round a hinge pin 9, which pins 9 and bushes 8 have pitch distances which correspond with the pitch distances of contact surfaces 7. Each contact surface 7 has a position running obliquely inward such that when a contact surface is driven in pushing manner by a bush 8 this latter tends to move toward the centre of conveyor belt 1. It reaches a stable position at the moment when its further inward directed displacement is blocked in that the bush 8 comes to lie against a likewise obliquely positioned stop surface 10 which, together with the contact surface 7 of the other link element, bounds a wedge-shaped space. A widened portion 11A moreover connects onto each drive protrusion 6 in the region of hinge pins 4, which portion serves on the one hand to function as stop surface for bushes 8 and on the other hand acts to enlarge the effective contact surface between pins 4 and the continuous registered holes 12 through which the pins extend, whereby the contact pressure is correspondingly reduced. The described structure results in a very stable positioning of bushes 8 relative to each drive protrusion 6. Additional widened portions 11B are provided on each link above hinge pin 4 and widened portion 11A. Widened portions 11B slide within elongated apertures 5 of neighboring links to further stabilize the belt in operation and prevent undesired motion of the links relative to one another out of the horizontal plane.

As shown clearly for instance in FIG. 1, each link element 2 has a generally zigzag form, wherein the crests of a link designated with 13 fit with clearance in the valleys designated 14 between the corresponding crests 13 of an adjoining link. The thus interwovenly placed crests of the adjoining link have the said eyes 5 through which the hinge pins extend.

It is noted that a link element can also consist in transverse direction of a plurality of link element segments coupled by respective hinge pins to each other and to following link elements. In this manner a comparatively wide conveyor belt can be constructed from relatively short link elements. In respect of the principle according to the invention wherein the driving takes place exclusively on the side edges, care will have to be taken that the driving forces are properly related to the mechanical stiffness of the pins.

Figure 4:
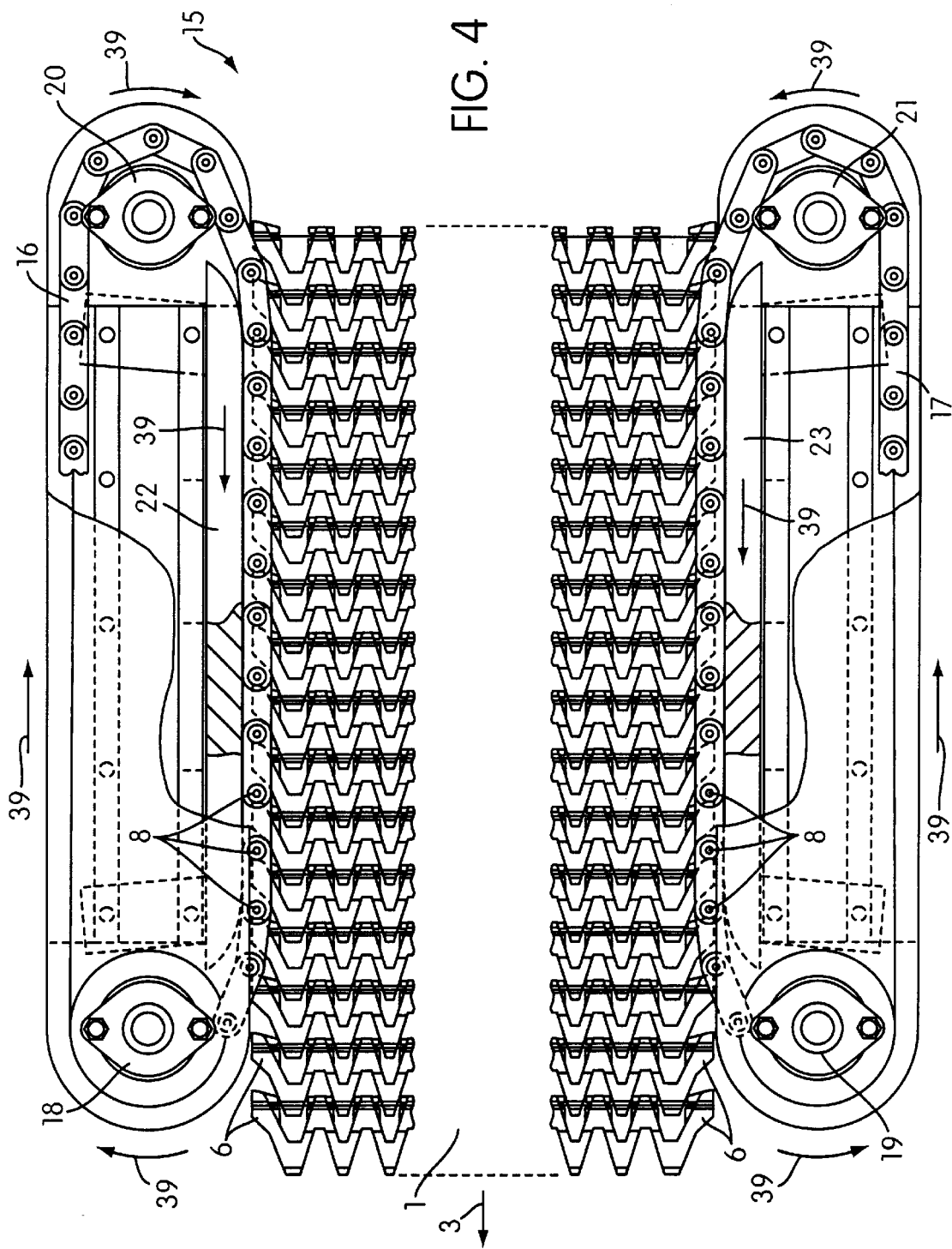
FIG. 4 shows a schematic top view of a transporting device, wherein a conveyor belt is driven via both its side edges.

FIG. 4 shows a part of transporting device 15 in which conveyor belt 1 is applied. This is driven on both its side edges by respective drive chains 16, 17. These are driven by motor means (not shown) on the downstream side 18, 19 respectively and returned on the upstream side round a guide. These guides are designated 20, 21. Over the respective active parts of chains 16, 17 they are urged toward the conveyor belt 1 by means of respective sliding strips 22, 23, for instance of nylon, in order to ensure the positive contact between bushes 8 and drive protrusions 6.

Figure 5:
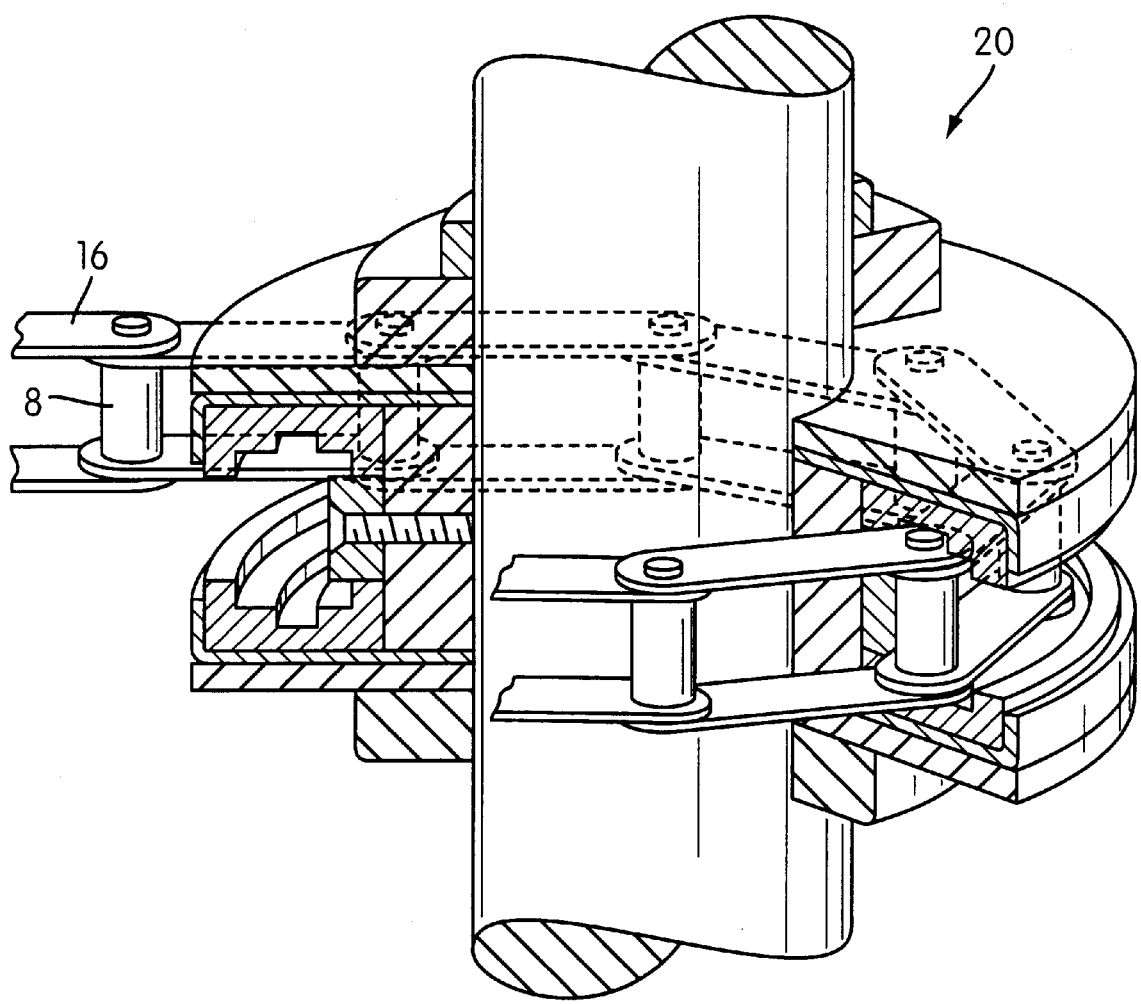
FIG. 5 shows a partly broken away perspective view of a guide for the conveyor belt according to FIG. 4.

FIG. 5 shows the guide 20 in partly broken away perspective view.

Figure 6:
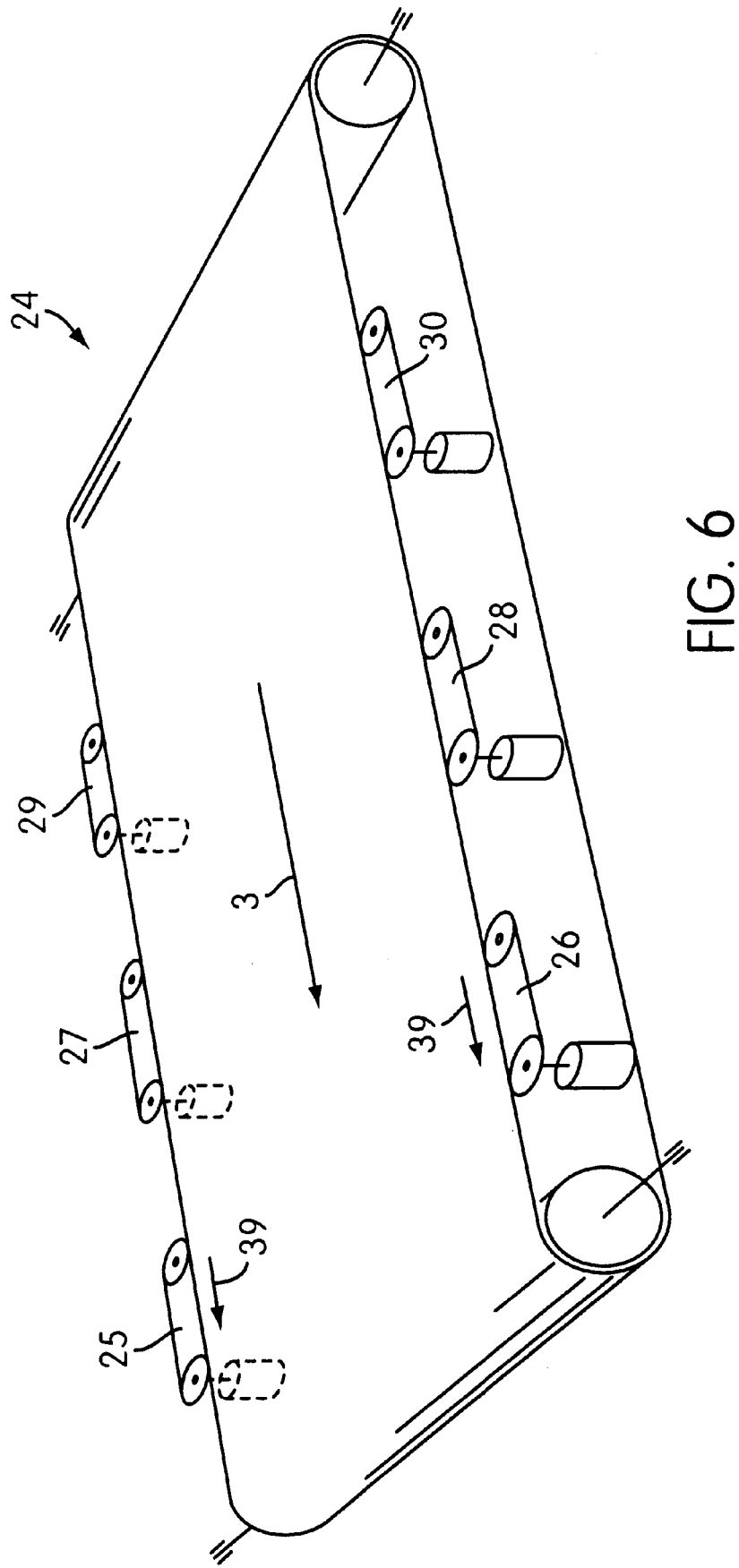
FIG. 6 shows a highly schematic perspective view of a conveyor belt according to the invention which is driven at diverse positions in the manner indicated in FIG. 4.

FIG. 6 shows highly schematically a possible configuration according to the invention. The transporting device 24 shown here comprises an endless conveyor belt, the active upper part of which is driven at three positions on its side edges by respective drives 25, 26; 27, 28; and 29, 30 provided with chains. In accordance with FIG. 4, the chain is driven in all cases on its downstream side by a schematically depicted motor.

In the device 24 of FIG. 6 the path of the conveyor belt 1 is rectilinear.

Figure 7:
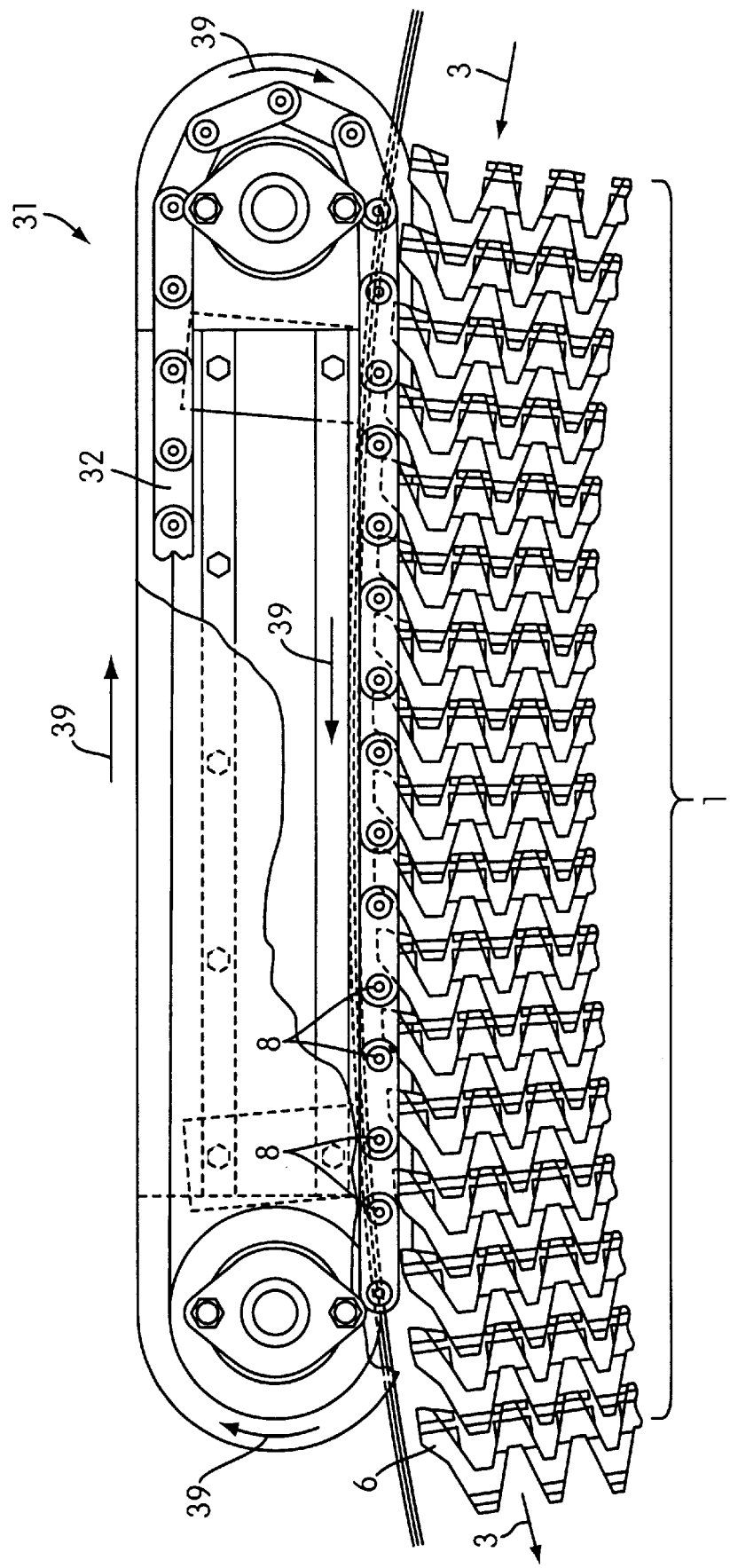
FIG. 7 shows a view corresponding with FIG. 4 of a variant in which the conveyor belt is guided drivably in a bend.

FIG. 7 shows a transporting device 31 wherein conveyor belt 1 is guided in an arc. In this embodiment it is not necessary to apply the sliding strips 22, 23 of FIG. 4. Due to the tension in drive chain 32, which can otherwise be identical to chain 16, this chain already tends to assume a straight form whereby bushes 8 have the tendency to move toward the centre of conveyor belt 1. The stable positioning between bushes 8 and drive protrusions 6 is hereby ensured in all conditions.

Figure 8:
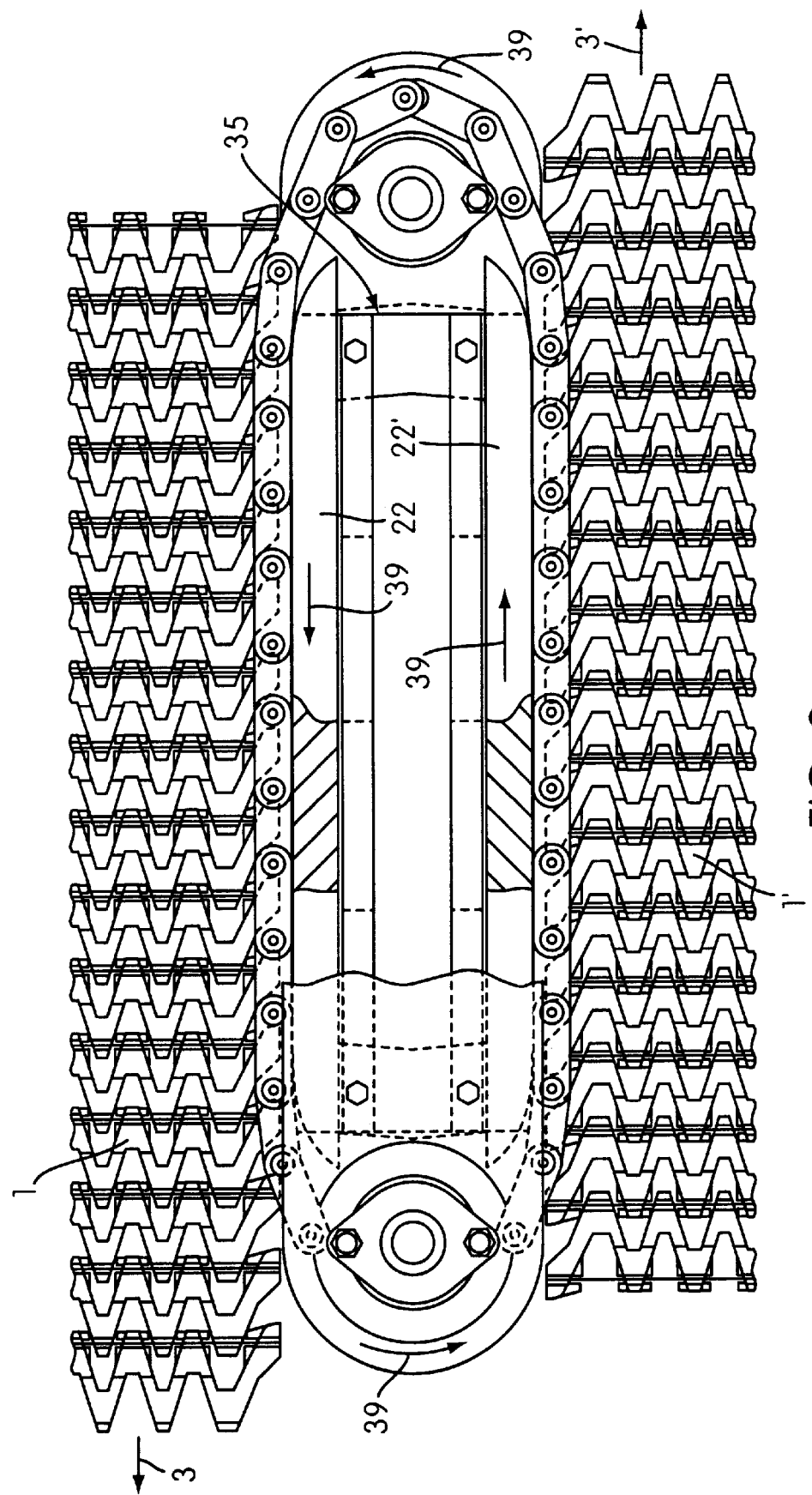
FIG. 8 is a view corresponding with FIG. 4 of a variant wherein one chain drive drives two conveyor belts in mutually opposing directions.

FIG. 8 shows an embodiment in which two conveyor belts 1, 1' are driven in opposing directions 3, 3' by one collective drive 32. In this embodiment use is made of sliding strips 22, 22' respectively.

Figure 9:
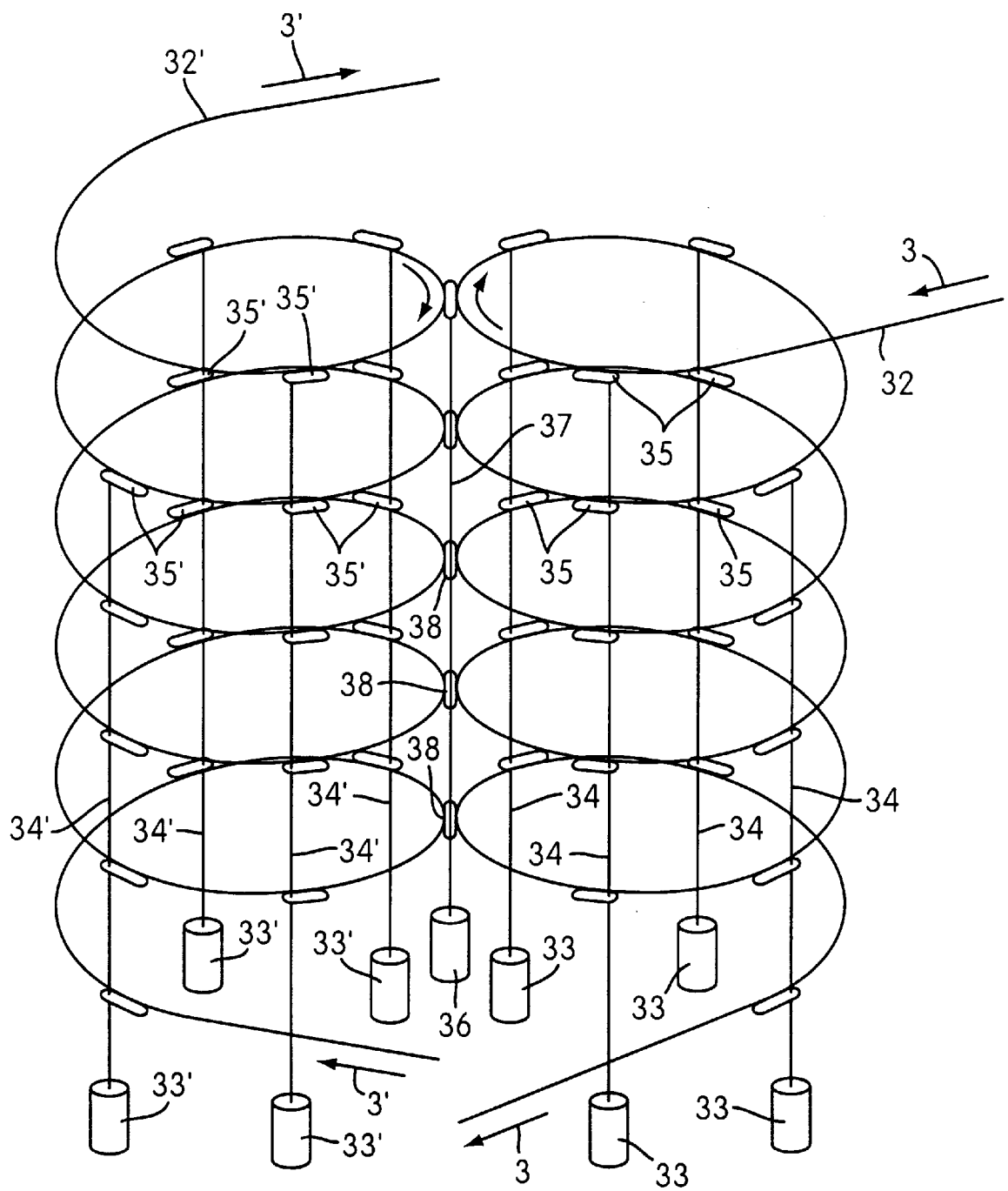
FIG. 9 is a highly schematic representation of a transporting device wherein two conveyor belts are guided via helical paths and the infeeds and outfeeds of the conveyor belts display a considerable difference in height, for instance for loading and/or unloading ship's holds.

Once again by way of example, FIG. 9 shows schematically two synchronously driven conveyor belts 32, 32'. In the manner shown clearly in FIG. 9, these each have a helical structure, wherein drive motors designated 33 drive respective drives 35, 35' via associated shafts 34, 34'. These drives are placed in register one above another in the manner shown so that motors 33, 33' can drive a plurality of drives 35, 35'. Via a shaft 37 a motor 36 drives a plurality of drives 38 placed in register one above another. These drives 38 drive conveyor belts 32, 32' in mutually opposing directions in the manner shown in FIG. 8. In this respect it will be apparent from FIG. 9 that conveyor belt 32 moves downward along its drawn part while conveyor belt 32' moves upward along its drawn part. In this manner the one conveyor belt can cause a product flow to move downward and the other can cause a product flow to move upward. In the non-active return part no use need be made of the helical structure and the conveyor belt can for instance be guided vertically.

In all figures the direction of movement of the drive chains is designated with 39.

Attention is drawn to the fact that for instance in the embodiment of FIG. 9 use does not necessarily have to be made of drive chains. Toothed wheels would also be very suitable in this embodiment.

It will be apparent that the invention is not limited to the described and drawn embodiments but that many modifications and combinations of the drawn and described aspects are possible.

I claim:

1. Conveyor belt comprising a plurality of link elements which are coupled pair-wise to each other by means of a hinge extending in transverse direction, which hinge comprises at least one hinge pin present on the one link element and extending transversely of the longtudinal direction of the conveyor belt and a plurality of eyes present on the other link element which engage round said hinge pin(s) and are correspondingly registered such that the conveyor belt is bendable in transverse direction relative to the principal plane of the conveyor belt, wherein the eyes in the principal plane of the conveyor belt have an enlarged dimension such that the conveyor belt is also bendable in its principal plane and wherein at least a number of link elements at equal mutual pitch distances have on at least one free side end zone an integral drive arm in the principal plane of the conveyor belt adapted to co-act with a drive element, said drive arm configured to bias the drive element into a stable position by directing the drive element inwardly and into abutment with a corresponding drive arm on a neighboring link element of said conveyor belt.

2. Conveyor belt as claimed in claim 1, wherein the eyes have an enlarged dimension in transverse direction relative to the principal plane of the conveyor belt such that limited torsion of the conveyor belt is possible.

3. Conveyor belt as claimed in claim 1, wherein each arm has a contact surface for co-action with a drive element forming part of a drive, for instance a tooth of a toothed wheel or a bush forming part of a hinge between two links of a drive chain, which contact surface has a form such that while exerting a pressure force on this contact surface the drive element assumes a stable position relative thereto in which the drive element undergoes an inward directed force relative to the conveyor belt and a stop surface blocks an inward directed displacement of the drive element.

4. Conveyor belt as claimed in claim 1, wherein each link element has a generally zigzag form such that the crests of a link fit with clearance in the valleys between the respective crests of an adjoining link and wherein the thus interwovenly placed crests of adjoining links have the said eyes through which the hinge pin(s) extends/extend.

5. Conveyor belt as claimed in claim 1, wherein each link element consists substantially of POM.

6. Conveyor belt as claimed in claim 1, wherein each link element consists of fibre-reinforced plastic, for instance glass fibre-reinforced POM.

7. Conveyor belt as claimed in claim 1, wherein all link elements are identical.

8. Transporting device comprising a conveyor belt as claimed in claim 1 and at least one drive which is adapted to drive the conveyor belt by exerting a pressure force for a successive time duration in the longitudinal direction of the conveyor belt on a drive arm forming part of a link element.

9. Device as claimed in claim 8, wherein the drive comprises a drive toothed wheel.

10. Device as claimed in claim 8, wherein the drive comprises a drive chain.

11. Device as claimed in claim 10, wherein the drive chain is held with its active part in contact with the conveyor belt by guide means.

12. Device as claimed in claim 11, wherein the guide means comprise a sliding strip of wear-resistant material.

13. Device as claimed in claim 10, wherein the drive chain comprises links which are mutually coupled by external cylindrical bushes enclosing hinges, which bushes serve for driving co-action with the drive arms of the link elements of the conveyor belt, which bushes are substantially freely rotatable round the associated hinge axes.

14. Device as claimed in claim 8, wherein a conveyor belt is driven from both sides by drive means.

15. Device as claimed in claim 8, wherein one drive serves to drive in opposing directions conveyor belts extending substantially parallel to each other on either side thereof and in one principal plane.

16. Device as claimed in claim 8, wherein in the region of a drive the conveyor belt is curved in its principal plane.

17. Device as claimed in claim 8, wherein at least two drives are placed one above another and are collectively coupled directly to a drive shaft.

18. Device as claimed in claim 8, wherein a conveyor belt consists of link elements as claimed in claim 2 and is twisted at least locally.

19. Device as claimed in claim 18, wherein the conveyor belt has at least one generally helical part with a difference in height between infeed and outfeed.

20. Device as claimed in claim 17, wherein the helical part extends through more than 360°.

21. A modular conveyor link adapted to interweave with links of similar construction, said link comprising:

a link body of alternating crests and valleys configured such that the crests of a link interweave within the valleys of an adjoining link;

transversly aligned eyes through the crests in said body adapted to receive hinge pins when said link arranged so that the eyes are in registration with the eyes of another link interwoven therewith;

a drive arm on at least one end of said link, said drive arm extending transversly outward in the principal plane of said link and adapted to co-act with a drive element of a conveyor drive, said drive arm having an angled foreward edge and a straight rearward edge such that said angled foreward edge directs a drive element inward and into abutment with a rearward edge of an adjacent link.

22. The link of claim 21, further comprising an integrally formed shoulder proximate the rearward edge of said driving arm for providing an enlarged abutment surface for a drive element.

23. The link of claim 21, wherein said eyes in one set of crests of said body are elongated slots allowing movement of hinge pins therein to enable collapse of said link within an adjacent link, and said eyes in the other set of crests of said body are circular.

24. The link of claim 23, further comprising an integrally formed shoulder proximate the rearward edge of said driving arm for providing an enlarged abutment surface for a drive element.

25. The link of claim 24, wherein said shoulder is disposed proximate the circular eye to provide an enlarged contact surface for a hinge pin.

26. The link of claim 25, further comprising an integarlly formed tab disposed proximate the circular eye in opposing relation to said shoulder to provide opposing enlarged contact surfaces for a hinge pin.

27. The link of claim 26, wherein said tab and said shoulder are sized to be slidingly received in said elongated slots of a neighboring link when said link collapses relative to the neighboring link.

* * * * *